(12) United States Patent
Gennari et al.

(10) Patent No.: US 6,210,627 B1
(45) Date of Patent: Apr. 3, 2001

(54) ARRANGEMENT FOR THE DOSED INTRODUCTION OF FINE-PARTICULATE MATERIAL INTO A REACTOR VESSEL

(75) Inventors: Udo Gennari, Linz; Leopold Werner Kepplinger, Leonding; Felix Wallner, Linz, all of (AT)

(73) Assignees: Voest-Alpine Industrieanlagenbau GmbH, Linz (AT); Pohang Iron & Steel Co., Ltd., Kyong Sang Book-Do; Research Institute of Industrial Science & Technology, Incorporated Foundation, Pohang, both of (KR)

( * ) Notice: Subject to any disclaimer, the term of this patent is extended or adjusted under 35 U.S.C. 154(b) by 0 days.

(21) Appl. No.: 09/284,095

(22) PCT Filed: Oct. 6, 1997

(86) PCT No.: PCT/EP97/05467

§ 371 Date: Apr. 7, 1999

§ 102(e) Date: Apr. 7, 1999

(87) PCT Pub. No.: WO98/15663

PCT Pub. Date: Apr. 16, 1998

(30) Foreign Application Priority Data

Oct. 8, 1996 (AT) .................................................. 1778/96

(51) Int. Cl.[7] ............................ C21B 13/14; C21B 13/00
(52) U.S. Cl. ............................ 266/44; 266/172; 266/216
(58) Field of Search .............................. 266/216, 44, 172

(56) References Cited

U.S. PATENT DOCUMENTS

| 4,277,205 | * | 7/1981 | Meunier ........................... 266/216 |
| 4,613,113 | * | 9/1986 | Saito et al. ....................... 266/216 |
| 5,413,315 | * | 5/1995 | Venas et al. ..................... 266/216 |

FOREIGN PATENT DOCUMENTS

| 2805816 | 8/1979 | (DE) . |
| 0063924 | 11/1982 | (EP) . |
| 58-210110 | 12/1983 | (JP) . |
| 90/07010 | 6/1990 | (WO) . |

* cited by examiner

Primary Examiner—Scott Kastler
(74) Attorney, Agent, or Firm—Ostrolenk, Faber, Gerb & Soffen, LLP

(57) ABSTRACT

An arrangement for the dosed introduction of fine-particulate material into a reactor vessel comprises a fluidized bed sluice, into which a material supply means enters from above and into which a gas duct feeding a fluidization gas runs in the lower end region thereof and which includes an overflow tube for conveying on the fine-particulate material. In order to introduce the fine-particulate material into the reactor vessel at specific zones, a plurality of independently connectable fluidized bed sluices are provided outside of the reactor vessel, the fluidized bed sluices having overflow tubes which project into the interior of the reactor vessel.

11 Claims, 3 Drawing Sheets

ARRANGEMENT FOR THE DOSED INTRODUCTION OF FINE-PARTICULATE MATERIAL INTO A REACTOR VESSEL

BACKGROUND OF THE INVENTION

1. Field of the Invention

The invention relates to an arrangement for the dosed introduction of fine-particulate material into a reactor vessel, comprising a fluidized bed sluice, into which a material supply means enters from above and into which a gas duct feeding a fluidization gas runs in the lower end region thereof and which includes an overflow tube for conveying on the fine-particulate material, as well as to a plant including an arrangement of this type and a method of operating this arrangement.

2. Description of the Related Art

An arrangement of the aforementioned type is known from U.S. Pat. No. 4,277,205. This arrangement features a central tube, from which a plurality of overflow tubes lead to charging points distributed over the cross section of the reactor vessel. The central tube, together with the overflow tubes, is arranged inside the reactor vessel in a way that it can be turned in order to ensure a uniform distribution of the fine-particulate material in the reactor vessel. The arrangement inside the reactor vessel is required for turning the overflow tubes but causes heavy wearing-out of the turning mechanism and of the seals, particularly if the reactor vessel is used for reactions taking place at higher temperatures and if violent gas flows occur.

The known arrangement has the disadvantage that the fine-particulate material can be fed into the reactor vessel only uniformly distributed over the cross section but not specifically to certain charging points or charging zones.

SUMMARY OF THE INVENTION

The object of the invention is to avoid these disadvantages and difficulties and to create an arrangement of the aforementioned type and a method of operating this arrangement, which allow a dosed introduction of fine-particulate material into the reactor vessel. In particular, the time-dependent feeding of fine-particulate material at specific points in various zones of the reactor vessel has to be made possible, wherein the arrangement, however, may be of rigid and fixed design so as to avoid wear problems and to minimize investment and maintenance expenses.

Another object of the invention is to create an arrangement for the introduction of fine-particulate reduction product from charging substances comprised of ore, in particular, iron ore and fluxes and at least partially having a portion of fines at an arrangement for the production of metal melts, in particular pig iron, wherein the reduction product forms highly gas-permeable zones, which, however, are connected with one another three-dimensionally, thus ensuring good accessibility for the reducing gas.

According to the invention, this problem is solved in an arrangement of the aforementioned type by a plurality of fluidized bed sluices which provided outside of the reactor vessel and which can be connected and disconnected independently of one another, whose overflow tubes project into the interior of the reactor vessel.

A preferred embodiment is characterized in that the arrangement is provided with a central tube forming a fluidized bed sluice and that at least two overflow tubes, each running into a further fluidized bed sluice, depart from the central tube, wherein each further fluidized bed sluice is formed by a receptacle, into which a gas duct feeding a fluidization gas runs in the lower region thereof and from which at least one overflow tube departs, running into the reactor vessel, and wherein the fluidization gas ducts each are equipped with valves for the locally dosed introduction of the fine-particulate material.

By means of the valves, individual or several of the further fluidized bed sluices enclosing the central tube can be activated or deactivated. The fine-particulate material first accumulates in the central tube and, when the central tube is being charged with a fluidization gas, also fills the further fluidized bed sluices. Depending on whether a fluidization gas is fed to one of the further fluidized bed sluices, this fluidized bed sluice becomes clear and the fine-particulate material can enter the reactor vessel from this fluidized bed sluice via the overflow tube. By alternately connecting the fluidization gas, the material flow and, thus, also the charging point or charging zone in the reactor vessel can be varied. Furthermore, the fine-particulate material can be dosed via the gas volume, therefore the valves are expediently designed as flow control valves.

It has been proved that a dosed introduction is expediently accomplished by means of at least two, yet eight at the most, and preferably three or four fluidized bed sluices.

In order to prevent the fine-particulate material entering the reactor vessel through an overflow tube in the form of a strand from fanning, the ends of the overflow tubes running into the reactor vessel are advantageously provided with a gas feeding means for forming a gas jacket developing on the lower end of the overflow tube, wherein the overflow tube expediently comprises a double jacket defining an annular gap cavity and the gas feeding means runs into the annular gap cavity.

For the formation of a gas jacket, the lower end of the overflow tube is preferably provided with an annular gap opening or several openings for the exit of a gas flowing through the annular gap cavity.

To allow charging of fine-particulate material to the entire cross section of the reactor gas, the fluidized bed sluices are expediently provided at a distance from the central tube and preferably in a radially symmetric arrangement.

An arrangement for the production of metal melts, in particular, pig iron, from charging substances comprised of ore, in particular, iron ore and fluxes and at least partially having a portion of fines, is characterized by at least two fluidized bed reactors consecutively connected in series, wherein the ore is conducted from one fluidized bed reactor to another fluidized bed reactor via conveying ducts in one direction and the reducing gas is conducted from one fluidized bed reactor to another fluidized bed reactor via reducing-gas connection ducts in the opposite direction, and by a melter gasifier, into which a supply duct conducting the reduction product from the fluidized bed reactor arranged last in the flow direction of the ore runs via an arrangement for the dosed introduction of the fine-particulate reduction product, as well as a duct supplying carbon and another duct supplying oxygen, a reducing-gas conveying duct departing from the melter gasifier and running into the fluidized bed reactor arranged last in the flow direction of the ore.

The gas ducts for feeding the fluidization gas advantageously depart from a reducing-gas conveying duct.

In order to form a highly gas-permeable bed from the fine-particulate material in the reactor vessel, the fluidized bed sluices, which are preferably arranged beside the central tube, are alternately activated.

According to a preferred embodiment, the fluidized bed sluices are activated on grounds of process measurements of a process occurring in the reactor vessel, by means of which the position of a charging point or charging zone for fine-particulate material is determined in the reactor vessel, whereupon the fine-particulate material is distributed by specifically switching off and on the fluidized bed sluices.

BRIEF DESCRIPTION OF THE DRAWINGS

In the following, the invention is explained in greater detail by the embodiments shown in the drawing.

DETAILED DESCRIPTION OF THE PREFERRED EMBODIMENTS

Figure 1:
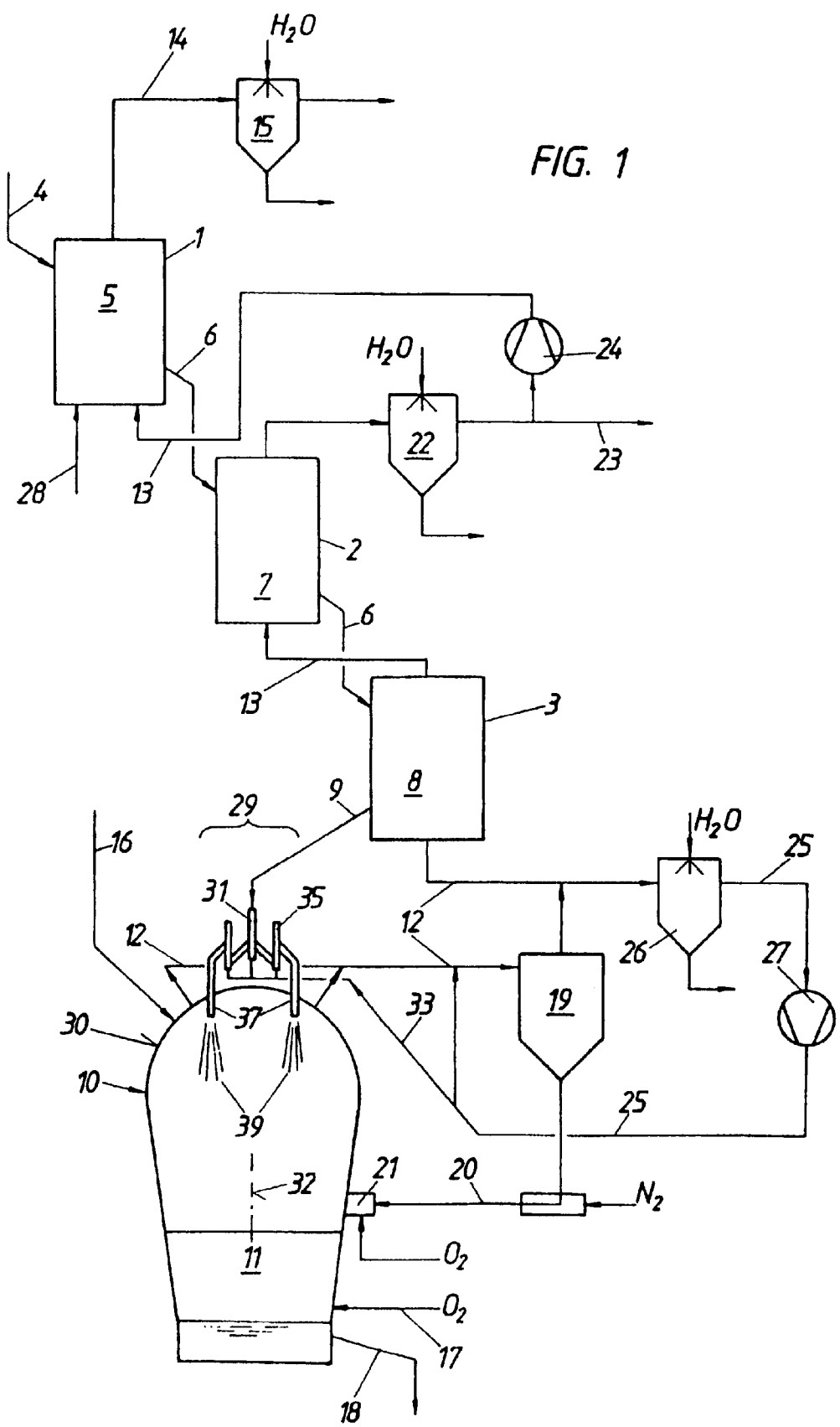
FIG. 1 schematically represents the example of an overall arrangement for the production of metal melts, in which the arrangement according to the invention is advantageously used.
Figure 3:
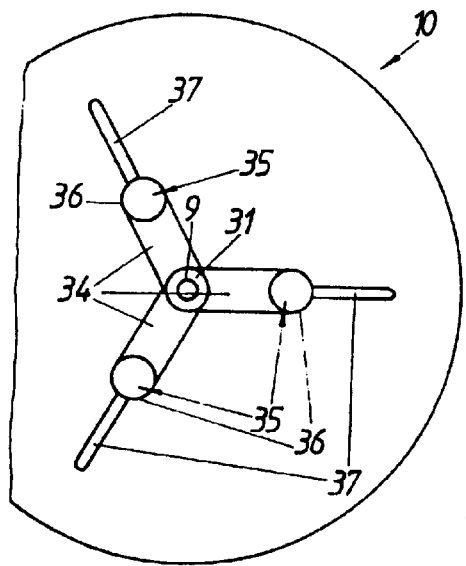
FIG. 3 represents a plan view of FIG. 2.

The arrangement according to FIG. 1 comprises three fluidized bed reactors 1 to 3 consecutively connected in series, wherein a fine-particulate material containing iron oxide, such as fine ore, is conducted to first fluidized reactor 1, where the fine ore is preheated and possibly prereduced in preheating stage 5, via ore conveying duct 4 and subsequently from fluidized bed reactor 1 to fluidized bed reactors 2, 3 via conveying ducts 6. In fluidized bed reactor 2, prereduction takes place in prereduction stage 7, and in fluidized bed reactor 3, the fine ore is finally or finish-reduced to sponge iron in final reduction stage 8.

The reduced fine-particulate reduction material, i.e. sponge iron, is conducted to melter gasifier 10 via conveying duct 9 in a specific way as described later. In melter gasifier 10, a reducing gas containing CO and $H_2$, which is formed from carbon carriers such as coal, and oxygenous gas in melter gasifier zone 11 formed by a fluidized bed. This reducing gas is introduced into fluidized bed reactor 3 via gas discharge duct 12, which serves as reducing-gas conveying duct 12 for fluidized bed reactor 3, which is arranged last in the flow direction of the fine ore.

The reducing gas is discharged from melter gasifier 10 via several gas outlet sockets of radially symmetric arrangement.

The reducing gas is conveyed from fluidized bed reactor 3 to fluidized bed reactors 2 to 1 in counterflow to the ore flow via connection ducts 13, discharged from fluidized bed reactor 1 as top gas via top gas discharge duct 14 and subsequently cooled and scrubbed in wet scrubber 15.

Melter gasifier 10 comprises a supply duct 16 for solid carbon carriers, supply duct 17 for oxygenous gases and possibly supply ducts for carbon carriers which are liquid or gaseous at ambient temperature, such as hydrocarbons, and for burnt fluxes. In melter gasifier 10, molten pig iron or molten steel input material and molten slag accumulate beneath melter gasifier zone 11, which are tapped via taphole 18.

In reducing-gas conveying duct 12, which departs from melter gasifier 10 and runs into fluidized bed reactor 3, dust-collecting means 19, such as a hot gas cyclone, is provided, wherein the dust particles separated in this cyclone are fed to melter gasifier 10 via return duct 20 with nitrogen as conveying means and via burner 21 under oxygen injection.

The reducing gas temperature can be adjusted by the preferably provided gas return duct 25, which departs from reducing-gas conveying duct 12 and returns part of the reducing gas into the reducing-gas conveying duct 12 via scrubber 26 and compressor 27, upstream of the arrangement of hot gas cyclone 19.

To adjust the preheating temperature of fine ore, an oxygenous gas, such as air or oxygen, can be fed to preheating stage 5, i.e. fluidized reactor 1, via duct 28, which results in partial combustion of the converted reducing gas fed to preheating stage 5.

Figure 2:
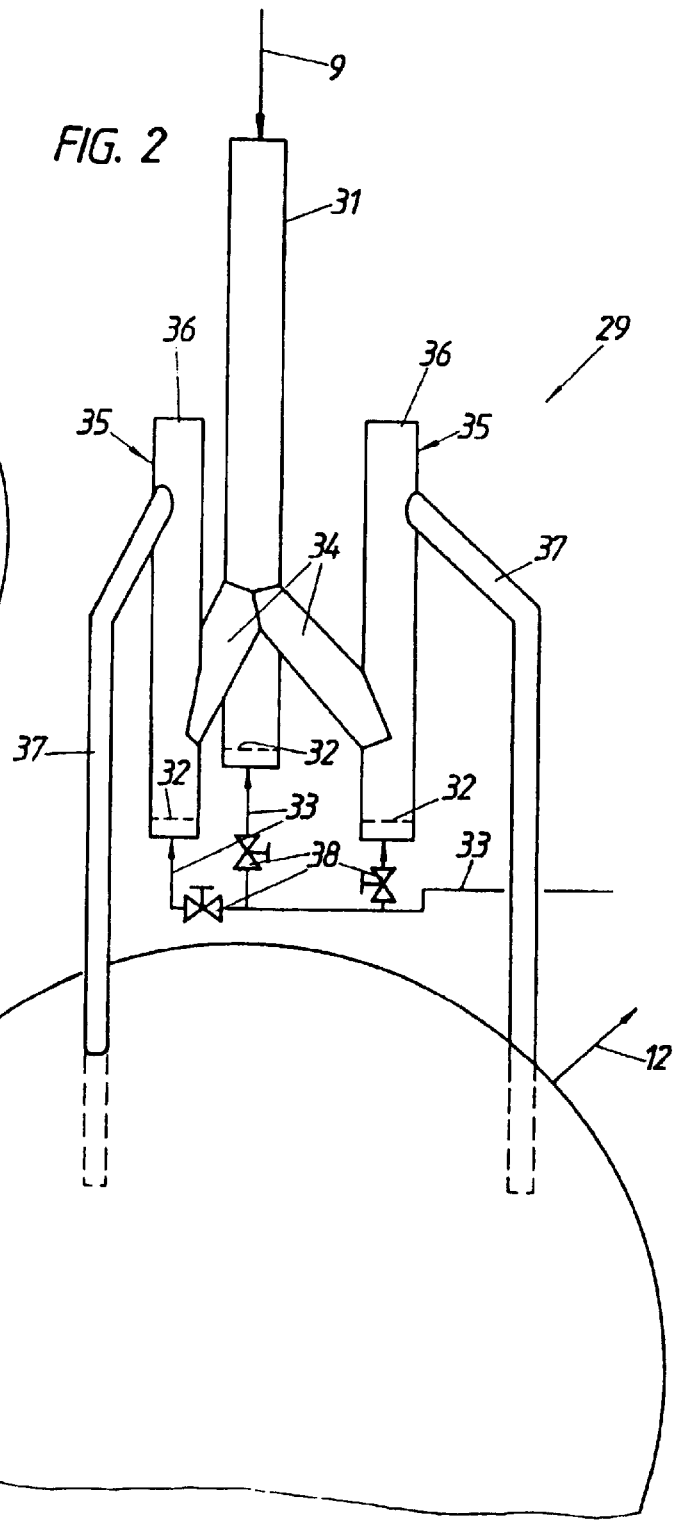
FIG. 2 illustrates a detail of FIG. 1 on enlarged scale.

According to the invention, the fine-particulate sponge iron is charged via charging means 29, which is located at dome 30, which closes melter gasifier 10 towards the top, and represented on enlarged scale in FIG. 2.

Charging means 29 is formed by central tube 31 representing the fluidized bed sluice, into which conveying duct 9 runs from above. The lower region of central tube 31 has a gas-permeable bottom 32 for forming a fluidized bed sluice, to which fluidization gas is fed via gas duct 33 feeding fluidization gas. Gas duct 33 is a branch duct of gas return duct 25.

From central tube 31, overflow tubes 34—three according to the represented embodiment—depart at a distance from the gas-permeable bottom, which lead radially symmetrically downwards at an angle from central tube 31 located centrally above melter gasifier 10. These overflow tubes 34 run into further fluidized bed sluices 35, which are formed by receptacle 36 and which, analogously to the central tube, are provided with gas-permeable bottom 32 in the lower region, with a junction of a gas duct 33 feeding a fluidization gas, and with overflow duct 37 departing in the upper region. The overflow ducts are arranged radially outwards and project through dome 30 of melter gasifier 10 into the interior of the latter.

All gas ducts 33 which run into one of fluidized bed sluices 31, 35 are provided with valves 38 so as to allow the permeability to and conveyance of or stoppage of conveyance of the fine-particulate reduction material by activating and deactivating each of fluidized bed sluices 31, 35, without requiring a mechanical actuation of parts coming into contact with the fine-particulate hot reduction material. By alternately activating various of the further fluidized bed sluices 35 and, thus, conveying via various overflow tubes 37, a more concentrated material flow can be achieved than by continuously conveying material via all overflow tubes. As a result, the discharge of fine-particulate material from melter gasifier 10 with reducing gas 12 existing melter gasifier 10 can be minimized because strands 39 entering the melter gasifier through overflow tubes 37 are denser and more compact.

The alternate activation and deactivation of overflow tubes 37 can also be used to counteract any nonuniformity in distribution of circumferential temperature in melter gasifier 10 or of the gas flow rates through gas outlets. In this case, process measurements are used to activate or deactivate a specific overflow tube out of overflow tubes 37 via a process computer in order to achieve a higher degree of equidistribution.

The temporary activation and deactivation of overflow tubes 37 can also be used to form lenses of particulate direct reduction material in melter gasifier 10, which are enclosed by degassed coal particles (char particles) and, thus, by optimally gas-permeable zones on all sides. The reducing gas can diffuse well into the lenses formed by fine-particulate direct reduction material from all sides.

Moreover, the use of fluidized bed sluices 31, 35 allows charging against a higher pressure in melter gasifier 10 as the pressure difference between fluidized bed reactors 31, 35 and melter gasifier 10 can be eliminated in fluidized bed sluices 31, 35. Furthermore, the material to be fed into the melter gasifier can be easily dosed by controlling the flow rate of the fluidization gas.

Figure 4:
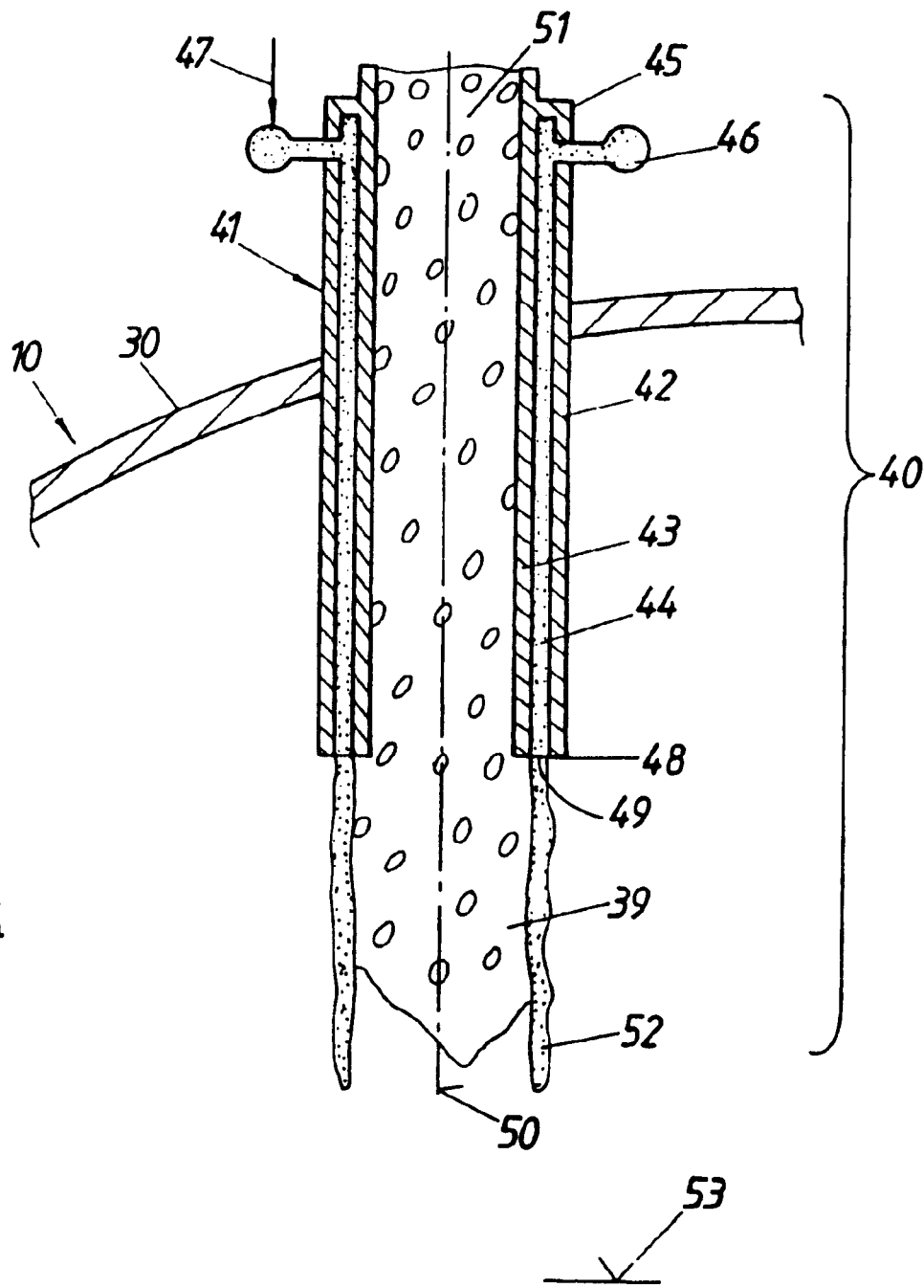
FIG. 4 shows a detail of an end of the overflow tube on enlarged scale according to a modification embodiment.

According to an embodiment represented in FIG. 4, end regions 40 of overflow tubes 37, which project into the interior of melter gasifier 10, are designed as double jacket tubes 41. Outer jacket 42 and inner jacket 43 of double jacket tube 41 define annular gap cavity 44, whose end 45, which is located outside of melter gasifier 10, is connected to closed-circuit supply duct 46 for cooling gas. Cooled reducing gas branched off from gas return duct 25 via branch duct 47 preferably with a further compressor not represented in greater detail is used as cooling gas. At end 48 of double jacket tube 41, which projects into the interior of melter gasifier 10, either annular gap opening 49 or several adjacent holes, with center lines located approximately in parallel with longitudinal center line 50 of double jacket tube 41, are provided, through which the cooling gas flows into the interior of melter gasifier 10.

The sponge iron, which forms a freely falling strand 39 at lower end 48 of double jacket tube 41, flows through central interior 51 of double jacket tube 41. Lower end 48 of double jacket tube 41 is located at a vertical distance from dome 30 at a point where the reducing gas has not yet reached its maximum flow velocity. This strand 39 is enclosed by the cooling gas also exiting at lower end 48 of double jacket tube 41 and forming gas jacket 52 at this point and is prevented from expanding. This gas jacket 52 thus forms a protective covering for at least part of the height of free fall of sponge iron—analogously to double jacket tube 41, so the fine particles of the sponge iron are not entrained by the reducing gas ascending at a relatively high velocity.

At level 53, where strand 39 expands as the supporting effect of the gas jacket weakens, the velocity of the reducing gas is considerably lower, so the fine particles are not prevented from falling or descending into the fluid bed of melter gasifier zone 11.

The cooling gas velocity at the point of exit from double jacket tube 41, i.e. its lower end 48, is at least 10 times and preferably 50 to 100 times higher than the maximum velocity of the reducing gas.

Thus, the gas jacket may be relatively thin-walled, so the volume of the reducing gas returned into melter gasifier 10 is relatively small.

As cavity 44 of double jacket tube 41 is flown by cooling gas, which subsequently exits at lower opening 49 of double jacket tube 41, a cooling effect is achieved in accordance with the mechanical load on double jacket tube 41.

The largest cooling effect of the cooling gas is achieved at the point of maximum load on double jacket tube 41 by its dead weight, i.e. in the zone where double jacket tube 41 passes through dome 30 of melter gasifier 10. While the cooling gas is flowing on through cavity 44 of double jacket tube 41, the cooling gas heats up, which results in an increase in cooling gas velocity. Therefore, relatively short double jacket tubes 41, whose mechanical and thermal loading is accordingly lower than in the case of very long downpipes reaching up until shortly above the fluid bed, will suffice. As a result, the design according to the invention features a very high stability.

Owing to the cooling effect, very expensive special materials on special ceramic basis or super alloys on Fe basis are not required. On the contrary, it will suffice to manufacture double jacket tube 41 of elevated-temperature steel.

What is claimed is:

1. An arrangement for dosed introduction of fine-particulate material into a reactor vessel, comprising a fluidized bed sluice, into which a material supply means enters from above and into which a gas duct feeding a fluidization gas runs in a lower end region thereof, and including an overflow tube for conveying the fine-particulate material, wherein a plurality of independently connectable fluidized bed sluices are provided outside of the reactor vessel, said plurality of sluices being adapted for charging multiple, different specific zones of the reactor vessel, thereby allowing the charging point of the vessel to be varied as desired, said fluidized bed sluices having overflow tubes that project into the interior of the reactor vessel.

2. An arrangement according to claim 1, wherein the arrangement comprises a central tube forming a central fluidized bed sluice and at least two overflow tubes, each running into a further fluidized bed sluice, depart from the central tube, wherein each further fluidized bed sluice is formed by a receptacle into which a gas duct feeding a fluidization gas runs into the lower region thereof and from which at least one overflow tube departs, running into the reactor vessel, and wherein the fluidization gas ducts each are equipped with valves for the locally dosed introduction of the fine-particulate material.

3. An arrangement according to claim 2, wherein between two and eight fluidized bed sluices are provided.

4. An arrangement according to claim 1, wherein ends of the overflow tubes opening into the reactor vessel are each provided with a gas feeding means for forming a gas jacket at a lower end of the overflow tube around strands of said fine-particulate material flowing therethrough.

5. An arrangement according to claim 4, wherein the overflow tube comprises a double jacket defining an annular gap cavity, the gas feeding means opening into the annular gap cavity.

6. An arrangement according to claim 5, wherein the lower end of the overflow tube is provided with an annular gap opening or several openings for the exit of a gas flowing through the annular gap cavity.

7. An arrangement according to claim 1, wherein a plurality of the fluidized bed sluices are provided at a distance from a central fluidized bed sluice in a radially symmetric arrangement.

8. An arrangement for production of metal melts from charging substances comprised of ore and fluxes and at least partially having a portion of fines, comprising:

at least two fluidized bed reactors consecutively arranged in series, wherein the ore is conducted from one fluidized bed reactor to another fluidized bed reactor via conveying ducts in one direction and reducing gas is conducted from one fluidized bed reactor to another fluidized bed reactor via reducing-gas connection ducts in an opposite direction, a melter gasifier, into which a supply duct conducting reduction product from the fluidized bed reactor arranged last in the flow direction of the ore runs via an arrangement for dosed introduction of fine-particulate reduction product according to claim 1, and a duct supplying carbon and oxygen, and a reducing-gas conveying duct (12) departing from the melter gasifier and running into the fluidized bed reactor arranged last in the flow direction of the ore.

9. An arrangement according to claim 8, wherein gas ducts for feeding the fluidization gas to a charging means of the melter gasifier depart from a reducing-gas conveying duct.

10. A method of operating an arrangement according to claim 1, wherein the fluidized bed sluices are arranged around a central tube and are alternately activated.

11. A method according to claim 10, wherein said alternately activating of the fluidized bed sluices is realized by process measurements of a process occurring within the reactor vessel, through which the position of a charging point or charging zone for fine-particulate material is determined in the reactor vessel, whereupon the distribution of the fine-particulate material is effected by concertedly switching on and off the fluidized bed sluices.

* * * * *